May 5, 1936.　　　A. CHOJNACKI　　　2,039,778
VEGETABLE GRATER
Filed March 6, 1935　　　2 Sheets-Sheet 1
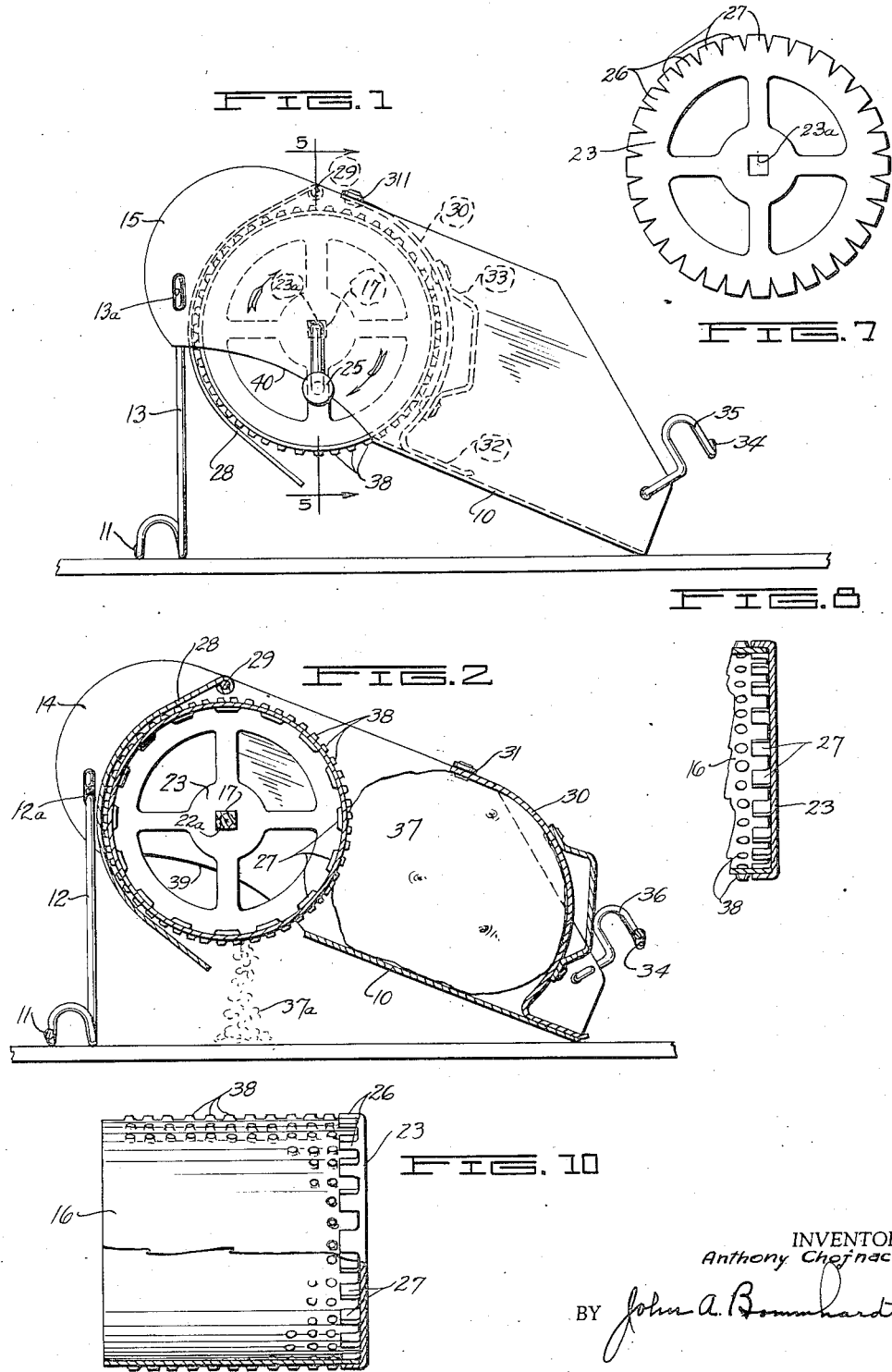

May 5, 1936.　　　A. CHOJNACKI　　　2,039,778
VEGETABLE GRATER
Filed March 6, 1935　　　2 Sheets-Sheet 2
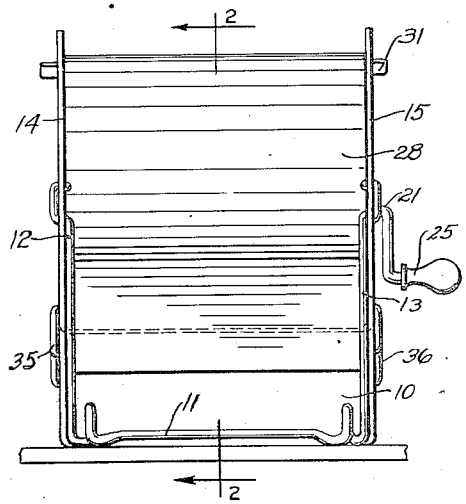
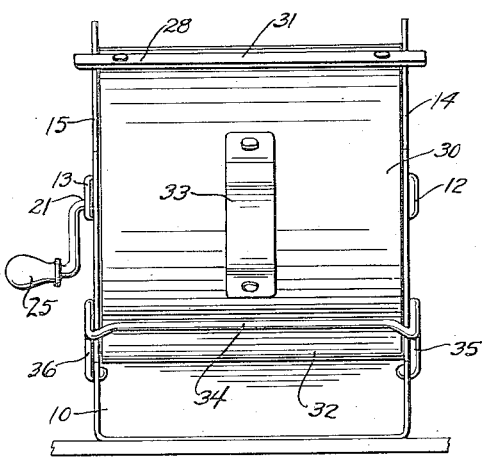
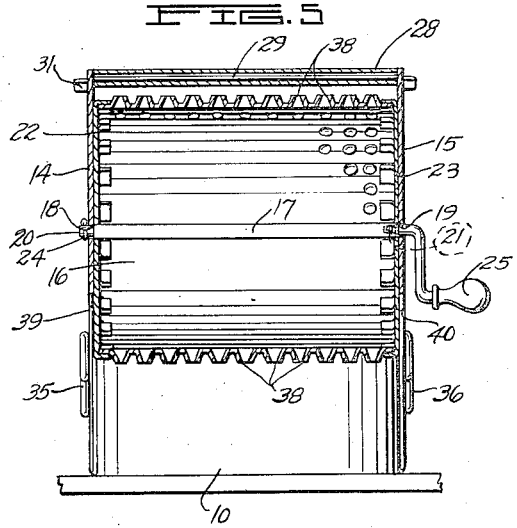
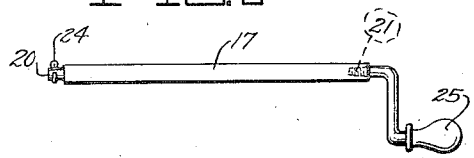
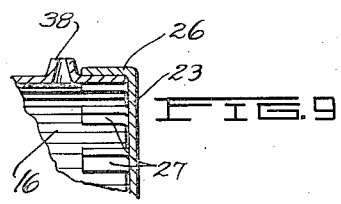
INVENTOR.
Anthony Chojnacki
BY John A. Bommhardt
ATTORNEY.

Patented May 5, 1936

2,039,778

UNITED STATES PATENT OFFICE 2,039,778

VEGETABLE GRATER

Anthony Chojnacki, Cleveland, Ohio, assignor of one-half to Joe Golenberg, Cleveland, Ohio Application March 6, 1935, Serial No. 9,525

1 Claim. (Cl. 146—177)

This invention relates to a vegetable grater, and is particularly useful in grating potatoes. The object of the invention is to provide an improved device of simple construction adapted for household use and capable of being readily operated for producing a mass of comminuted vegetables.

The device is illustrated in the accompanying drawings in which:—

Fig. 1 is a side elevation of the device.

Fig. 2 is a section taken on the lines 2—2 of Fig. 3.

Fig. 3 is a front elevation of the device.

Fig. 4 is a rear elevation of the device.

Fig. 5 is a section taken on the lines 5—5 of Fig. 1.

Fig. 6 is a view of the grater shaft.

Fig. 7 is a plan view of an end plate stamping.

Fig. 8 is a fragmentary section of the grater cylinder and end plate.

Fig. 9 is an enlarged fragment of Fig. 8.

Fig. 10 is an elevation partly in section of the grater cylinder and end plate.

Referring to the illustrations: a channel casing or frame 10 is elevated at one end by a supporting member 11 with projecting arms 12 and 13 which are bent at the top as shown in Fig. 3 and sprung into slots 12a and 13a in the projecting side walls 14 and 15 respectively of said channel frame 10.

A cylinder grater 16 is rotatable by means of a square shaft 17 mounted therethrough and supported at each end in apertures 18 and 19 in the projecting side walls 14 and 15 respectively said apertures forming a bearing surface for the smaller portions 20 of the shaft 17 and the threaded end 21 of a handle 25. The square shaft 17 is mounted through square apertures 22a and 23a in end plates 22 and 23, said plates being pressed in and over the open ends of the cylinder grater 16 as shown specifically in Figs. 8, 9 and 10. A cotter pin 24 inserted in an aperture in the smaller round end 20 of the shaft 17 and secures said shaft between the walls 14 and 15 when the threaded end 21 of the removable handle 25 is screwed tightly into the threaded end 17a of the shaft 17 after shaft is in position. The fingers 26 and 27 of the end plates 20 and 23 are bent in such manner as to superimpose fingers 26 over the ends of the cylinder grater 16 while alternating fingers 27 are pressed under the edge and within the cylinder grater 16.

A pivoted shield 28 is mounted on a shaft 29 mounted between the walls 14 and 15 and directly above the cylinder grater 16, and this shield partly encircles the said grater as shown in Figs. 1 and 2. A sliding follower 30 with a cross bar 31 at the top which slides on the top of side walls 14 and 15 and a flange 32 at the bottom which slides on the inside surface of the channel frame 10 has a handle 33 attached to its outer surface and is used to force the vegetable against the grating surface of the cylinder grater 16. A cross member 34 is attached at each by arms 35 and 36 to the side walls of the channel frame 10.

In operation the vegetable 37 is placed within the channel frame 10 between the sliding follower 30 and the cylinder grater 16 and by the guard the vegetable is pressed against the cylinder grater 16 which is revolved by means of the shaft 17 revolving within the bearing surfaces of the projecting walls 14 and 15; as the cylinder grater turns the outwardly projecting lugs at perforations 38 in said cylinder grater cut into the vegetable 37 and the grated vegetable 37a is carried downward and ejected through the opening between the cut away portions 39 and 40 of the projecting side walls 14 and 15, and the pivoting shield 28 protects the operator by preventing the grated vegetable from flying out as the cylinder grater revolves. The supporting member 11 and the cross member 34 are made in such manner as to be mounted over the edges of a dish or pan for ease in handling and operating.

I claim:

A vegetable grater comprising a channel casing having an opening in the bottom thereof, a rotary grating cylinder mounted between the sides of said casing above said opening, a shield pivoted at its upper end to and between the sides of the casing above the cylinder and extending partly around one side of the latter and depending to said opening, and a sliding follower movable toward and from the cylinder, between the sides of the casing, at the opposite side of the cylinder the follower having a cross bar at the top the ends of which rest upon and slide along the upper edges of the casing.

ANTHONY CHOJNACKI.